(12) United States Patent
Otaki et al.

(10) Patent No.: US 7,491,472 B2
(45) Date of Patent: Feb. 17, 2009

(54) VOLUME HOLOGRAM TRANSFER FOIL

(75) Inventors: Hiroyuki Otaki, Tokyo (JP); Tetsuya Toshine, Kashiwa (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 378 days.

(21) Appl. No.: 10/626,908

(22) Filed: Jul. 25, 2003

(65) Prior Publication Data

US 2005/0191560 A1 Sep. 1, 2005

(30) Foreign Application Priority Data

Jul. 26, 2002 (JP) .............................. 2002-217432

(51) Int. Cl.
*G03H 1/02* (2006.01)
(52) U.S. Cl. ..................... 430/1; 430/2; 359/3; 359/2
(58) Field of Classification Search .................. None
See application file for complete search history.

(56) References Cited

U.S. PATENT DOCUMENTS

| 5,342,672 | A | * | 8/1994 | Killey | 428/32.64 |
| 5,643,678 | A | * | 7/1997 | Boswell | 428/467 |
| 5,719,616 | A | * | 2/1998 | Danjo et al. | 347/214 |
| 6,066,378 | A | * | 5/2000 | Morii et al. | 428/40.2 |
| 6,495,295 | B1 | * | 12/2002 | Shioda et al. | 430/1 |
| 6,596,360 | B2 | * | 7/2003 | Toshine et al. | 428/40.1 |
| 6,852,397 | B2 | * | 2/2005 | Toshine et al. | 428/212 |
| 2001/0046630 | A1 | * | 11/2001 | Toshine et al. | 430/1 |
| 2002/0015897 | A1 | * | 2/2002 | Toshine et al. | 430/2 |
| 2002/0018253 | A1 | * | 2/2002 | Toshine et al. | 359/3 |
| 2004/0234816 | A1 | * | 11/2004 | Azakami et al. | 428/694 B |
| 2004/0253521 | A1 | * | 12/2004 | Otaki et al. | 430/1 |

FOREIGN PATENT DOCUMENTS

| EP | 1022625 | * | 7/2000 |
| JP | 2000-272295 |  | 10/2000 |

* cited by examiner

*Primary Examiner*—Martin J Angebranndt
(74) *Attorney, Agent, or Firm*—Ladas & Parry LLP

(57) ABSTRACT

The main object is to provide a volume hologram transfer foil showing an excellent foil cutting property and capable of being transferred easily to a transferred body. This object is solved by providing a volume hologram transfer foil comprising a substrate, a volume hologram layer formed on the substrate and a heat sensitive adhesive layer formed on the volume hologram layer, wherein the volume hologram layer has a breaking strain at 25° C. in a range of 0.5% to 15% and a breaking strain at 120° C. in a range of 0.5% to 30%, and the heat sensitive adhesive layer has a breaking strain at 25° C. in a range of 0.5% to 15%.

6 Claims, 2 Drawing Sheets

VOLUME HOLOGRAM TRANSFER FOIL

BACKGROUND OF THE INVENTION

1. Field of the Invention

The present invention relates to a volume hologram transfer foil used for, for example, security application and the like.

2. Description of the Related Art

Conventionally, in most hologram transfer foils, surface relief type hologram having irregularity on the surface is used, and in its general structure, a substrate, a delaminating layer, surface relief type hologram layer, reflective film layer and heat sensitive adhesive layer are laminated sequentially. In the case of a hologram transfer foil, since layers such as a delaminating layer, hologram layer, heat sensitive adhesive layer and the like other than the substrate are cut due to a heat mold in its heat transfer (also referred to simply as transfer, hot stamp), it is necessary that a foil cutting property is excellent and hologram is assuredly transferred to a transferred body. A hologram transfer foil of general relief type shows an excellent foil cutting property and used in many applications.

On the other hand, as materials capable of being used regarding volume hologram, silver salt materials, photopolymers and the like are mentioned, and in general, photopolymers which can be produced by a dry process are used in mass production. However, such a photopolymer is required to have increased refractive index modulation value ($\Delta n$) to make the image of hologram brighter, and in allowing a film to have low viscosity and forming volume hologram, monomers and the like are moved in the layer, therefore, the hardness of a coated film itself is low. Consequently, a foil cutting property is poor and a transferring property is instable, leading to a problem that it is extremely difficult to make a transfer foil of volume hologram.

Even if the hardness of a material is increased by improving the volume hologram material itself for solving this problem, there is also a problem that it is difficult to completely improve a transferring property and refractive index cannot be modulated sufficiently by further increasing the hardness of a coated film, making the hologram darker.

Further, the one is known which the foil cutting property is improved by previously making slits on a delaminating layer, hologram layer, heat sensitive adhesive layer and the like at transferring portions and delaminating them from a slit line along a heat mold in transferring. However, this method has a problem that a slit mold for making slits and a slit process are necessary, needing time and cost.

Furthermore, the present inventors have suggested a volume hologram transfer foil having a hologram layer made of a specific material having specific breaking strain(Japanese Patent Application Laid-Open (JP-A) No. 2000-272295)). However, also in this method, soft thermoplastic resins are often used as a heat sensitive adhesive layer in making a transfer foil, consequently, its foil cutting property is a problem in some

SUMMARY OF THE INVENTION

As described above, the provision of a volume hologram transfer foil showing an excellent foil cutting property and capable of being transferred easily to a transferred body is desired.

The present invention provides a volume hologram transfer foil comprising a substrate, a volume hologram layer formed on the substrate and a heat sensitive adhesive layer formed on the volume hologram layer, wherein the volume hologram layer has a breaking strain at 25° C. in a range of 0.5% to 15%, a breaking strain at 120° C. in a range of 0.5% to 30%, and the heat sensitive adhesive layer has a breaking strain at 25° C. in a range of 0.5% to 15%.

In the present invention, by rendering the breaking strain of the heat sensitive adhesive layer equivalent to or lower than the breaking strain of the volume hologram layer, the volume hologram transfer foil is provided having an excellent foil cutting property and having an improved transferring property enabling easy transfer to a transferred body while maintaining the brightness of the hologram image.

In the above-mentioned invention, it is preferable that the heat sensitive adhesive layer contains a fine particle. The reason for this is that, by this, fragility can be imparted to the heat sensitive adhesive layer and the breaking strain of the heat sensitive adhesive layer can be within the abovementioned range.

Further, the present invention provides a volume hologram transfer foil comprising a substrate, a volume hologram transfer foil comprising a substrate, a volume hologram layer formed on the substrate and a heat sensitive adhesive layer formed on the volume hologram layer, wherein the heat sensitive adhesive layer contains a synthetic resin having heat sensitive adhesiveness and a fine particle having average particle size smaller than the film thickness of the heat sensitive adhesive layer.

In the present invention, by allowing the fine particle to be contained in the heat sensitive adhesive layer, fragility can be impacted to the heat sensitive adhesive layer, and the volume hologram transfer foil having an excellent foil cutting property can be obtained while maintaining the brightness of the hologram image. Further, since the average particle size of the fine particle is within the above mentioned range, an excellent transferring property can be obtained without losing the smoothness of the heat sensitive adhesive layer and close adherence of the heat sensitive adhesive layer with a volume hologram layer and an adhered body.

In the above-mentioned invention, it is preferable that the film thickness of the heat sensitive adhesive layer is in a range of 1 μm to 11 μm and the average particle size of the fine particle is in a range of 0.05 pm to 10 μm. The reason for this is that when the average particle size of the fine particle is smaller than the above mentioned range, it is difficult to impart fragility to the heat sensitive adhesive layer and when larger than the above mentioned range, dispersibility is poor, the smoothness of the heat sensitive adhesive layer is lost, and there is a possibility of exerting an adverse influence on a hologram image.

Further, in the above-mentioned invention, the fine particle may not have a heat-cross-linkable group and photo-cross-linkable group. The reason for this is that since the fine particle does not have cross-linkability, cracking easily occurs between the fine particle and the synthetic resin due to stress at transferring volume hologram and it becomes possible to impart larger fragility to a heat sensitive adhesive layer.

Furthermore, in the above-mentioned invention, it is preferable that the volume hologram layer has a breaking strain at 25° C. in a range of 0.5% to 15% and a breaking strain at 120° C. in a range of 0.5% to 30%, and the heat sensitive adhesive layer has a breaking strain at 25° C. in a range of 0.5% to 15%. The reason for this is that, by rendering the breaking strain of the heat sensitive adhesive layer equivalent to or lower than the breaking strain of the hologram layer, the volume hologram transfer foil is provided having an excellent foil cutting property and having an improved transferring property } enabling easy transfer to a transferred body while maintaining the brightness of the hologram image.

In the above-mentioned invention, it may also be permissible that the fine particle is an organic fine particle having thermoplasticity and having a glass transition temperature of 120° C. or higher. By doing so, the heat sensitive adhesive layer can be provided as a layer having an excellent foil cutting property.

The above-mentioned fine particle may also be a resin bead pigment. The reason for this is that, by this, it is possible to provide a volume hologram transfer foil having a background with an excellent designing.

Furthermore, it may also be permissible that the fine particle is a fluorescent fine particle. The reason for this is that, by this, when the volume hologram layer is irradiated with ultraviolet ray, the heat sensitive adhesive layer can emit light, and the hologram layer having a specific background can be formed.

Still further, the present invention may also have a delaminating layer between the substrate and the volume hologram layer. The reason for this is that, by this, a volume hologram transfer foil having an excellent foil cutting property and an excellent delaminating property can be provided.

According to the present invention, by rendering the breaking strain of the heat sensitive adhesive layer equivalent to or lower than the breaking strain of the hologram layer, a volume hologram transfer foil having an improved transferring property which can be easily transferred to a transferred body, with an excellent foil cutting property, while maintaining the brightness of a hologram image, is provided.

DETAILED DESCRIPTION OF PREFERRED EMBODIMENTS

The present invention relates to a volume hologram transfer foil. It will be illustrated in detail below. The volume hologram transfer foil of the present invention has two embodiments. The first embodiment is a volume hologram transfer foil comprising a substrate, a volume hologram layer formed on the substrate and a heat sensitive adhesive layer formed on the volume hologram layer, wherein the volume hologram layer has a breaking strain at 25° C. in a range of 0.5% to 15% and a breaking strain at 120° C. in a range of 0.5% to 30%, and the heat sensitive adhesive layer has a breaking strain at 25° C. in a range of 0.5% to 15%. And the second embodiment is a volume hologram transfer foil comprising a substrate, a volume hologram layer formed on the substrate and a heat sensitive adhesive layer formed on the volume hologram layer, wherein the heat sensitive adhesive layer contains a synthetic resin having heat sensitive adhesiveness and a fine particle having average particle size smaller than the film thickness of the heat sensitive adhesive layer.

Figure 1:
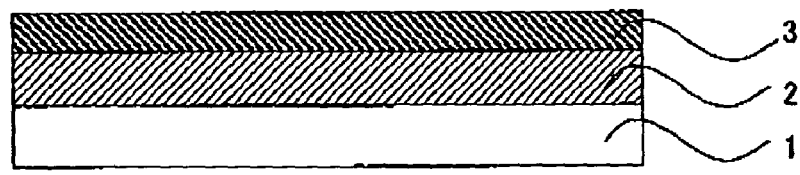
FIG. 1 is a schematic sectional view showing one example of the volume hologram transfer foil of the present invention.
Figure 2:
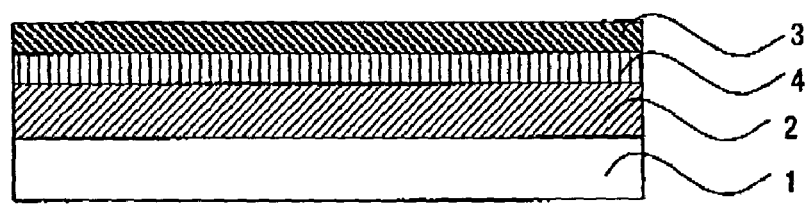
FIG. 2 is a schematic sectional view showing another example of the volume hologram transfer foil of the present invention.
Figure 3:
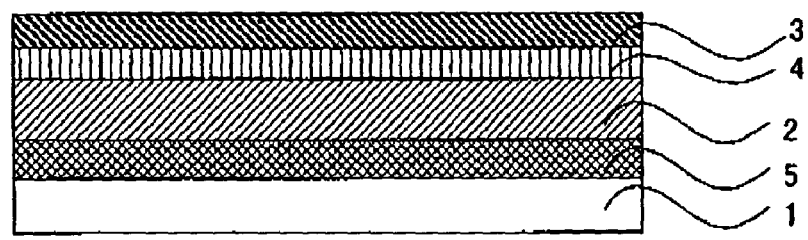
FIG. 3 is a schematic sectional view showing another example of the volume hologram transfer foil of the present invention.

Here, in either of the above-mentioned embodiments, the volume hologram transfer foil of the present invention is not particularly limited as long as it comprises, as shown for example in FIG. 1, a substrate 1, a volume hologram layer 2 formed on the substrate 1 and a heat sensitive adhesive layer 3 (also referred to as heat sealing layer) formed on the volume hologram layer 2, and for example, as shown in FIG. 2, it may comprise a substrate 1, a volume hologram layer 2 formed on the substrate 1, a primer layer 4 formed on the volume hologram layer 2, and a heat sensitive adhesive layer 3 formed on the primer layer 4. Further, as shown for example in FIG. 3, it may comprise a delaminating layer 5 in between the substrate 1 and the volume hologram layer 2. It is preferable to provide a delaminating layer in between the volume hologram layer and the substrate because delaminating property between the substrate and volume hologram layer becomes stable at heat transfer. For enhancing close adherence between the delaminating layer and volume hologram layer, a primer layer may further be provided.

Figure 4:
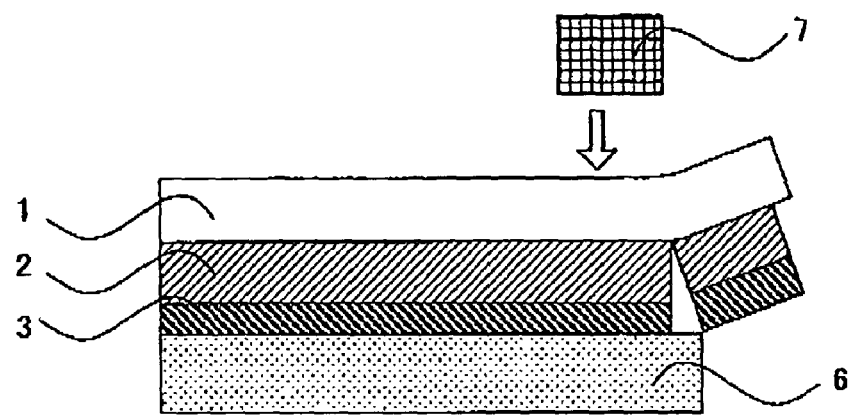
FIG. 4 is a schematic sectional view showing one example of transfer of the volume hologram transfer foil of the present invention.

In conducting transfer using the volume hologram transfer foil of the present invention in either of the above-mentioned embodiments, the volume hologram transfer foil of the present invention is laminated on the surface of a transferred body 6 to be endowed with hologram so that the heat sensitive adhesive layer 3 of the transfer foil contacts the surface, and heating and pressing with a stamper 7 is conducted from the side of the substrate 1 of the transfer foil at parts to be endowed with hologram to melt and adhere the heat sensitive adhesive layer 3 at the desired parts, as shown for example in FIG. 4. Then, by delaminating the transfer foil, the volume hologram layer 2 and heat sensitive adhesive layer 3 will be broken and only a transfer layer at desired parts is transferred, hologram can be imparted to the surface of a transferred material. In this operation, it is important that the volume hologram layer 2 and heat sensitive adhesive layer 3 can be broken easily, and in the present invention, tendency of breaking is represented by breaking strain.

According to the present invention, a volume hologram transfer foil having an excellent foil cutting property can be provided in either of the above-mentioned embodiments. Each embodiment will be illustrated below.

1. First Embodiment

First, the first embodiment of the volume hologram transfer foil of the present invention is described. The first embodiment of the volume hologram transfer foil of the present invention is a volume hologram transfer foil comprising a substrate, a volume hologram layer formed on the substrate and a heat sensitive adhesive layer formed on the volume hologram layer, wherein the volume hologram layer has breaking strain at 25° C. and 120° C. in predetermined ranges and the heat sensitive adhesive layer has breaking strain at 25° C. in a predetermined range.

In conventional volume hologram transfer foils, a flexible material has to be used as a volume hologram layer, and for obtaining a clear hologram image, it is necessary to increase the film thickness of a hologram layer, consequently, a foil cutting property is poor and a transferring property is very instable. Though it is possible to increase the hardness of a material by improving the material itself of a volume hologram layer, when the hardness of a coated film is increased too much, the brightness of a hologram image lowers and it is difficult to improve a transferring property while maintaining the brightness of a hologram image. The present applicant discloses, in JP-A No. 2000-272295, a volume hologram transfer foil in which the material of a hologram layer is limited to a material having specific breaking strain. However, since a flexible thermoplastic resin is used as a heat sensitive adhesive layer, a volume hologram transfer foil, as a whole, may not have a sufficient foil cutting property, therefore, it is desired to improve a transferring property to a transferred body.

The present inventors have further investigated the disclosed invention in JP-A No. 2000-272295, and resultantly found that by limiting the breaking strain of a heat sensitive adhesive layer in addition to the breaking strain of a volume hologram layer, a foil cutting property is improved and a transferring property to a transferred body increases, leading to completion of the present invention. As the measure of a foil cutting property, breaking strain which is one of mechanical strengths is used.

Here, as specific breaking strain of the volume hologram layer at 25° C. and 120° C., it is preferable that the breaking strain at 25° C. is in a range of 0.5% to 15%, particularly in a range of 1% to 10%, and the breaking strain at 120° C. is in a range of 0.5% to 30%, particularly in a range of 1% to 20%. The reason for this is that, out of these ranges, a foil cutting property is insufficient and transfer of hologram is difficult.

It is preferable that the breaking strain at 25° C. of the heat sensitive adhesive layer is in a range of 0.5% to 15%, particularly in a range of 1% to 10%. By setting the breaking strain of the volume hologram layer and heat sensitive adhesive layer respectively within the above mentioned ranges, the volume hologram transfer foil can have an excellent foil cutting property. When only either of the breaking strain of the volume hologram layer or the breaking strain of the heat sensitive adhesive layer is within the above mentioned range, the effect is insufficient.

A stress-strain curve (S-S curve) is automatically recorded using the following measuring apparatus and measuring conditions, and the breaking strain of the volume hologram layer is read from this curve.

For a measuring sample (test piece), a material of which measurement is intended is applied on a substrate, if necessary dried or treated, then, a test piece in the form of film, delaminated from the substrate, having a width of 5 mm to 10 mm and a length of 20 mm to 50 mm is given. The thickness of the test piece is preferably in a range of 20 μm to 100 μm from the standpoint of easy handling. When a delaminating treatment is conducted on the surface of the substrate, it is easy to delaminate the test piece in the form of film.

(Measurement of Breaking Strain at 25° C. and 120° C.)
    Measuring apparatus: INSTRON universal tester 5500 (manufactured by INSTRON, trade name)
    Tension speed: 2 mm/min For a measuring method of the breaking strain of the heat sensitive adhesive layer, a heat sensitive adhesive agent is applied on PET, which had been subjected to a surface delaminating treatment, so that the thickness after drying is 20 μm, and the breaking strain was measured by the following measuring method according to JIS-K-7127.

(Measuring Method)
    Measuring apparatus: INSTRON universal tester (manufactured by INSTRON, trade name)
    Tension speed: 2 mm/min
    Atmosphere: 25° C.
    Measuring sample: width 25 mm×length 50 mm For evaluation of the heat transferring property of a transfer foil of volume hologram, a surface delaminating-treated PET film was delaminated from a volume hologram transfer foil and thermally transferred to a card made of polyvinyl chloride under conditions of a temperature of 140° C., a pressure of 3 MPa and a period of 0.8 seconds, and transferring properties to a transferred material such as a foil cutting property, generation of burr, and the like were observed.

Each component of the volume hologram transfer foil of this embodiment will be illustrated.

(1) Heat Sensitive Adhesive Layer

First, the heat sensitive adhesive layer used in the volume hologram transfer foil of this embodiment is described. The heat sensitive adhesive layer used in this embodiment has a breaking strain at 25° C. in a range of 0.5% to 15% as described above, and is not particularly limited as long as it is a layer capable to adhere the volume hologram layer and the transferred material described below.

In this embodiment, as a method of setting the breaking strain of a heat sensitive adhesive layer within the range, for example, a method in which a fine particle is contained in a synthetic resin having a heat sensitive adhesive property can be listed. By allowing a fine particle to be contained in a heat sensitive adhesive layer, fragility can be imparted to the heat sensitive adhesive layer, and by this, the breaking strain of the heat sensitive adhesive layer can be set within the range.

It is preferable that the average particle size of fine particles used in this embodiment is 0.05 μm to 10 μm, particularly 0.05 μm to 6 μm. The reason for this is that when the average particle size of the fine particles is smaller than the range, it is difficult to impart fragility to the heat sensitive adhesive layer and when larger than the range, dispersibility is poor, the smoothness of the heat sensitive adhesive layer is lost, and there is a possibility of exerting an adverse influence on a hologram image.

The average particle size in this embodiment is a value measured by a laser method, Specifically, in the laser method, fine particle is dispersed in a solvent, this dispersion solvent is irradiated with laser beam, and light scattered by the fine particles is analyzed to obtain an average particle size. In this embodiment, it is a value calculated using particularly a particle size analyzer MICRO TRACK UPA Model-9230 manufactured by Leeds & Northrup.

It is preferable that the content of such fine particle is 10 parts by weight to 500 parts by weight, particularly 20 parts by weight to 200 parts by weight based on 100 parts by weight of a synthetic resin constituting a heat sensitive adhesive layer. The reason for this is that when the content of the fine particles is smaller than the range, a foil cutting property is poor, and when larger than the range, dispersibility is poor, unevenness occurs in fragility, and the foil cutting property of a heat sensitive adhesive layer becomes instable. Further reason for this is that there is also a possibility of occurrence of decrease in adhesion with an adhered body. The shape of fine particles is not particularly limited, and it may be in a form of, for example, sphere, rectangular parallelopiped, plate, scale, needle, hollow body and the like.

As the fine particles (filler) used in this embodiment, there are listed organic fine particles and/or inorganic fine particles, namely, organic fine particles, inorganic fine particles, mixtures of an organic substance and an inorganic substance, those obtained by coating an organic substance around an inorganic substance, and the like.

As the inorganic fine particles, for example, calcium carbonate, calcium silicate, clay, kaolin, talc, silica, glass, diatomaceous earth, mica powder, alumina, magnesium oxide, zinc oxide, barium sulfate, aluminumsulfate, calcium sulfate, basic magnesium carbonate, molybdenum disulfide and the like can be applied.

The organic fine particles are preferably a thermoplastic resin having a glass transition temperature of 120° C. or more, and fine particles of, for example, WAX, polyethylene, fluorine-based resin, acrylic resin, methacrylic resin, phenol resin, urea resin, melamine resin, epoxy resin, unsaturated polyester resin and the like (thermosetting resins), copolymers of polystyrene, styrene and/or α-methylstyrene with other monomers (for example, maleic anhydride, phenylmaleimide, methyl methacrylate, butadiene, acrylonitrile and the like) (for example, AS resin, ABS resin, MBS resin, heat resistant ABS resin and the like) and the like can be applied. The reason for this is that, by this, a heat sensitive adhesive layer can show excellent foil cutting. When organic fine particles are used, refractive index with a synthetic resin constituting a heat sensitive adhesive layer is relatively close, therefore, a heat sensitive adhesive layer can get transparency. Coloration can be conducted also by using a material containing an inorganic pigment incorporated. Further, the fragility of a heat sensitive adhesive layer can be improved easily by controlling a functional group on the surface of a particle in comparison with inorganic particles.

Here, it is possible to use, as the fine particles, also fluorescent fine particles or resin bead pigment. By use of such fluorescent fine particles or resin bead pigment, hologram having a colored background can be obtained in transferring volume hologram, further, in the case of addition of fluorescent fine particles, it becomes possible to cause emission of fluorescence by irradiation with ultraviolet ray, consequently, an effect of anticounterfeit is also improved.

As such fluorescent fine particles, for example, ultrafine particles obtained by using an in-gas vaporization method from a mixture of zinc oxide (ZnO), silicon oxide ($SiO_2$) and manganese dioxide ($MnO_2$), fine particle metals obtained by applying and calcinating an organic metal compound containing a metal emitting fluorescence (Zn, Mg, Cd, Gd, Y, In, Si, Al, lanthanoid series and the like) to decompose and remove an organic component, and the like can be applied.

Specifically, a fluorescent fine particle dispersion prepared by dispersing fluorescent fine particles in a solvent is used. For example, Lumicol NKW 2102 (green), 2103 (red), 2108 (blue) and the like manufactured by Nippon Keiko K.K. are listed. SW-12 (green), SW-13 (red), SW-18 (blue) and the like manufactured by SINLOIHI CO., LTD are also listed. When such fluorescent fine particles are used, a heat sensitive adhesive layer emits fluorescence to give a hologram image having a specific background when irradiated with ultraviolet ray, and fabrication can be judged by the presence or absence of its emission, therefore, an effect of anticounterfeit can be improved.

The resin bead pigment can be obtained by dispersing a fine powder of a pigment in a synthetic resin and molding the resin into particles. As the material of the bead pigment, there are listed, for example, those obtained by coating the surface of a fine powder of a pigment such as $Fe_2O_3$, $TiO_2$, $CaCO_3$, quinacridone pigment and the like with a resin having elasticity such as polyurethane, acryl, epoxy, polyester, nylon, fluorine resin, vinyl chloride resin and the like or adding a plasticizer, stabilizer, surfactant and the like to such a resin as necessity, or those obtained by dispersing such a pigment powder in the elastic resin. The color of the bead pigment may be optionally selected depending on the desire, and for example, pearl tone using a colorless transparent bead pigment, multi-color combining bead pigments of two or more colors, and the like are also possible.

The kind and the like of the synthetic resin used in the heat sensitive adhesive layer of this embodiment are not particularly limited as long as it is a synthetic resin capable of adhering a volume hologram layer and a transferred body described later, and there can be used, for example, an ethylene-vinyl acetate copolymer resin, vinyl chloride-vinyl acetate copolymer resin, polyamide resin, polyester resin, polyethylene resin, ethylene-isobutyl acrylate copolymer resin, polybutyral resin, polyvinyl acetate and its copolymer resin, ionomer resin, acid-denaturated polyolefin-based resin, (meth)acrylic resin such as acrylic resin and methacrylic resin, acrylic acid ester-based resin, ethylene-(meth)acrylic acid copolymer, ethylene(meth)acrylate ester copolymer, polymethyl methacrylate-based resin, cellulose-based resin, polyvinyl ether-based resin, polyurethane resin, polycarbonate resin, polypropylene resin, epoxy resin, phenol resin, vinyl-based resin, maleic acid resin, alkyd resin, polyethylene oxide resin, urea resin, melamine resin, melamine-alkyd resin, silicone resin, rubber-based resin, styrene butadiene styrene block copolymer (SBS), styrene isobutylene styrene block copolymer (SIS), styrene ethylene butylenes styrene block copolymer (SEBS), styrene ethylene propylene styrene block copolymer (SEPS) and the like (thermoplastic resin). Preferable is a composition composed of an ethylene-vinyl acetate copolymer resin (EVA) and having a vinyl acetate content of 25% or more and capable of being heat-sealed at temperatures of 180° C. or lower. Furthermore, additives such as a dispersing agent, filler, plasticizer, antistatic agent and the like may be appropriately added, if necessary. As the antistatic agent, nonionic surfactants, anionic surfactants, cationic surfactants and the like, and polyamides and acrylic acid derivatives and the like can be applied. The heat sensitive adhesive layer may also be colored.

The heat sensitive adhesive layer used in this embodiment is formed by dispersing or dissolving a synthetic resin having the heat sensitive adhesive property and the fine particles into a solvent, applying the dispersion or solution by a coating method such as roll coat, reverse roll coat, gravure coat, gravure reverse coat, comma coat, bar coat, wire bar coat, rod coat, kiss coat, knife coat, die coat, flow coat, dip coat, spray coat and the like, and drying and/or curing the coated film.

The thickness of such a heat sensitive adhesive layer is appropriately selected depending on the kind of a volume hologram transfer foil and the kind of a transferred body and the like, and usually from about 1 μm to 11 μm, preferably from about 1 μm to 6 μm. The reason for this is that, with the thickness of less than the range, adhesion with a transferred body is not sufficient, and with the thickness over this range, a foil cutting property is poor and heating temperature in transferring has to be enhanced.

(2) Volume Hologram Layer

Next, the volume hologram layer used in this embodiment will be illustrated. The volume hologram layer used in this embodiment is a layer on which a volume hologram image can be formed, and is not particularly limited as long as the breaking strain at 25° C. is in a range of 0.5% to 15% and the breaking strain at 120° C. is in a range of 0.5% to 30%, as described above.

In general, as the material forming a volume hologram layer, known volume hologram recording materials are listed such as a silver salt material, dichromate gelatin emulsion, photo-polymerizable resin, photo-crosslinkable resin and the like, however, as the photosensitive material for forming hologram for forming the volume hologram layer of this embodiment, suitably used are the following photosensitive materials (i) and (ii) from the standpoint of production efficiency. Each of such materials will be described below.

(i) Photosensitive material composed of binder resin, photo-polymerizable compound, photo-polymerization initiator and sensitizing dye First, each of the photosensitive materials will be described.

(Binder Resin)

As the binder resin in this photosensitive material are poly (meth)acrylate ester or partial hydrolyzates thereof, polyvinyl acetate or its hydrolyzate, copolymers having at least one compound selected from the group of copolymerizable monomers such as acrylic acid, acrylic ester, and the like as a polymerization component, or mixtures thereof, polyisoprene, polybutadiene, polychloroprene, partial acetalized compounds of polyvinyl alcohol; namelypolyvinyl acetal, polyvinyl butyral, polyvinyl acetate, vinyl chloride-vinyl acetate copolymer and the like, or mixtures thereof, and the like can be listed. Here, in forming a volume hologram layer, there is a process of heating and moving a monomer for stabilizing recorded hologram. For this, the binder resin is preferably one having relatively lower glass transition temperature and consequently providing easy movement of a monomer.

(Photo-polymerizable Compound)

As the photo-polymerizable compound contained in a photosensitive material, photo-polymerizable and photo-crosslinkable monomers, oligomers, prepolymers, and mixture thereof having at least one ethylenically unsaturated bond in one molecule, as described later, can be applied, and for example, unsaturated carboxylic acids and salts thereof, esters of unsaturated carboxylic acids with aliphatic polyhydric alcohol compounds, amide compounds of unsaturated carboxylic acids with aliphatic polyvalent amine compounds, and the like are listed.

As the specific examples of monomers of unsaturated carboxylic acids, mentioned are acrylic acid, methacrylic acid, itaconic acid, crotonic acid, isocrotonic acid, maleic acid and the like, and regarding the specific examples of monomers of esters of aliphatic polyhydric alcohol compounds with unsaturated carboxylic acids, as the acrylic ester, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate and the like are listed.

As the methacrylate ester, tetramethylene glycol dimethacrylate, triethylene glycol dimethacrylate, neopentyl glycol dimethacrylate, trimethylolpropane trimethacrylate, trimethylolethane trimethacrylate and the like are listed. As the itaconate ester, ethylene glycol diitaconate, propylene glycol diitaconate, 1,3-butane diol diitaconate and the like are listed. As the crotonate ester, ethylene glycol dicrotonate, tetramethylene glycol dicrotonate, pantaerythritol dicrotonate, sorbitol tetracrotonate and the like are listed. As isocrotonate ester, ethylene glycol diisocrotonate, pentaerythritol diisocrotonate, sorbitol tetraisocrotonate and the like are listed. As the maleate ester, ethylene glycol dimaleate, triethylene glycol dimaleate, pentaerythritol dimaleate, sorbitol tetramaleate and the like are listed.

As the halogenated unsaturated carboxylic acid, 2,2,3,3-tetrafluoropropyl acrylate, 1H,1H,2H,2H-heptadecafluorodecyl acrylate, 2,2,3,3-tetrafluoropropyl methacrylate and the like are listed. As the specific examples of monomers of amides of unsaturated carboxylic acids with aliphatic polyvalent amine compounds, methylenebisacrylamide, methylenebismethacrylamide, 1,6-hexamethylenebisacrylamide, 1,6-hexamethylenebismethacrylamide and the like are listed.

(Photo-polymerization Initiator)

As the photo-polymerization initiator in the initiator system, 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isooxazolone, 2-mercaptobenzimidazole, imidazole dimers and the like are exemplified. It is preferable that the photo-polymerization initiator is subjected to a decomposition treatment after recording hologram from the standpoint of stabilization of the recorded hologram. For example, the organic peroxide system is preferable since it is easily decomposed by irradiation with ultraviolet ray.

(Sensitizing Dye)

As the sensitizing dye, thiopyrylium salt-based dyes, merocyanine-based dyes, quinoline-based dyes, styrylquinoline-based dyes, ketocoumarin-based dyes, thioxanthene-based dyes, xanthene-based dyes, oxonol-based dyes, cyanine dyes, rhodamine dyes, thiopyrylium salt-based dyes, pyrylium ion-based dyes, diphenyl iodonium ion-based dyes and the like showing light absorption at 350 to 600 nm are exemplified. It may also be a sensitizing dye showing light absorption in the wavelength range of 350 nm or less or 600 nm or more.

(Photosensitive Material)

The compounding ratio of a photosensitive material composed of the binder resin, the photo-polymerizable compound, the photo-polymerization initiator and the sensitizing dye is as described below. The photo-polymerizable compound is used in a proportion of 10 parts by weight to 1000 parts by weight, preferably of 10 parts by weight to 100 parts by weight based on 100 parts by weight of the binder resin. The photo-polymerization initiator is used in a proportion of 1 part by weight to 10 parts by weight, preferably of 5 parts by weight to 10 parts by weight based on 100 parts by weight of the binder resin. The sensitizing dye is used in a proportion of 0.01 part by weight to 1 part by weight, preferably of 0.01 part by weight to 0.5 parts by weight based on 100 parts by weight of the binder resin. Additionally, as the components of a material for forming volume hologram, for example, plasticizers, glycerin, diethylene glycol, triethylene glycol and various nonionic surfactants, cationic surfactants, anionic surfactants and the like are listed.

The photosensitive materials are made into coating solution having a solid content of 15% to 25% using methyl ethyl ketone, cyclohexanone, xylene, tetrahydrofuran, ethylcellosolve, methylcellosolve acetate, ethyl acetate, isopropanol and the like by itself or as a mixed solvent thereof. The volume hologram layer is formed by coating by bar coat, spin coat or dipping and the like when a supporting body is in the form of sheet (each one sheet). When a supporting body is in the form of long roll, coating is conducted by gravure coat, roll coat, die coat or comma coat and the like, and drying is conducted and/or if necessary hardening is conducted. The thickness of thus obtained volume hologram-forming material layer is from 0.1 µm to 50 µm, preferably from 5 µm to 20 µm, and if necessary, a protective film may be laminated. As the protective film, a resin film having high transparency and having high smoothness such as a polyethylene terephthalate film, polypropylene film, polyvinyl chloride film and the like having a thickness of 10 µm to 100 µm may advantageously be pasted by rubber rollers and the like. Further, as the photosensitive material, ONNIDEX 801, commercial product manufactured by Du Pont Kabushiki Kaisha, and the like may be used, for example.

On the photosensitive material, recording is conducted by using laser light of two light fluxes. As this laser light, for example, light having a wavelength of 633 nm by helium-neon ion laser, light having a wavelength of 514.5 nm, 488 nm, 457.9 nm by argon ion laser, and light having a wavelength of 647.1 nm, 568.2 nm, 520.8 nm by krypton ion laser, in the visible light quantity range, further, light having a wavelength of 337.5 nm, 350.7 nm, 356.4 nm by krypton ion laser (1.5 W), and light having a wavelength of 351.1 nm, 368.8 nm by argon ion laser (40 mW), light having a wavelength of 332.4 nm by neon ion laser (50 mW), light having a wavelength of 325.0 nm by cadmium ion laser (15 mW) and the like can be applied.

Of them, one wavelength is taken out, and interference fringe is recorded using a wavelength rendering a photo-polymerization initiator to be excited, interference light of object light and reference light is recorded, or a protective film is peeled off, then, an original plate of volume hologram is closely adhered to a volume hologram layer, laser is directed from the side of the volume hologram layer, and interference fringe of reflective light from the original plate and incident light is recorded, to give information of volume hologram. By this, single color hologram or color hologram can be obtained.

Thereafter, stable volume hologram is obtained through a process of decomposing a photo-polymerization initiator by irradiation with ultraviolet ray of 0.1 to 10000 mJ/cm$^2$, preferably of 10 to 1000 mJ/cm$^2$ from a light source such as an extra-high pressure mercury lamp, high pressure mercury lamp, carbon arc, xenon arc, metal halide lamp and the like, and a heat treatment process in which a photo-polymerizable compound is diffused and moved, for example, by heating at 120° C. for 120 minutes, or other processes.

(ii) Photosensitive material composed of cationic polymerizable compound, radical polymerizable compound, photo-radical polymerization initiator system which is sensitized by light of specific wavelength to cause polymerization of radical polymerizable compound, and photo-cationic polymerization initiator system which shows low sensitivity to light of specific wavelength and which is sensitized by light of other wavelength to cause polymerization of cationic polymerizable compound Next, the photosensitive material will be described. The photosensitive material is composed of a cationic polymerizable compound which is in liquid form at room temperature, a radical polymerizable compound, a photo-radical polymerization initiator system which is sensitized by light of specific wavelength to cause polymerization of the radical polymerizable compound, and a photo-cationic polymerization initiator system which shows low sensitivity to light of the above mentioned specific wavelength and which is sensitized by light of other wavelength to cause polymerization of the cationic polymerizable compound.

This photosensitive material is coated on a supporting body, then, irradiated with light such as laser light or the like which sensitizes the photo-radical polymerization initiator system, then, irradiated with light of other wavelength than that of the above mentioned laser light which sensitizes the photo-cationic polymerization initiator system, to cause recording of hologram. First, the radical polymerizable compound is polymerized by irradiation with light such as laser light or the like (hereinafter, referred to as first exposure). Then, the cationic polymerizable compound is cationic-polymerized by a Broensted acid or Lewis acid generated by decomposition of the photo-cationic polymerization initiator system, by whole surface exposure conducted subsequently (hereinafter, referred to as post exposure).

Each of the photosensitive materials will be described.

(Cationic Polymerizable Compound)

As the cationic polymerizable compound, which is in liquid form at room temperature is used since polymerization of a radical polymerizable compound is preferably conducted in a composition of relatively low viscosity. As such a cationic polymerizable compound, diglycerol diether, pentaerythritol polydiglycidyl ether, 1,4-bis(2,3-epoxypropoxy perfluoroisopropyl)cyclohexanone, sorbitol polyglycidyl ether, 1,6-hexanediol glycidyl ether, polyethylene glycol diglycidyl ether, phenyl glycidyl ether and the like are listed.

(Radical Polymerizable Compound)

As the radical polymerizable compound, that having at least one ethylenically unsaturated double bond in the molecule is preferable. It ispreferable that the average refractive index of a radical polymerizable compound is larger than the average refractive index of the cationic polymerizable compound, and particularly larger by 0.02 or more. The reason for this is because the volume hologram is formed by difference in refractive index between the radical polymerizable compound and cationic polymerizable compound. Therefore, when difference in the average refractive index is not more than the above mentioned value, modulation of refractive index becomes insufficient. As the radical polymerizable compound, for example, acrylamide, methacrylamide, styrene, 2-bromostyrene, phenyl acrylate, 2-phenoxyethyl acrylate, 2,3-naphthalene dicarboxylic acid (acryloxyethyl) monoester, methylphenoxyethyl acrylate, nonylphenoxyethyl acrylate, β-acryloxyethyl hydrogen phthalate and the like are listed.

(Photo-Radical Polymerization Initiator System)

The photo-radical polymerization initiator system may be an initiator system which, by first exposure for production of hologram, generates an active radical, and the active radical polymerizes a radical polymerizable compound, alternatively, a sensitizer which is in general a component absorbing light may be used in combination with an active radical-generating compoundor acid-generating compound. As the sensitizer in such a photo-radical polymerization initiator system, color compounds such as dyes are often used for absorbing visible laser light, however, in the case of colorless transparent hologram, use of a cyanine-based dye is preferable. The reason for this is that, since a cyanine-based dye is in general easily decomposed by light, when it is left for from several hours to several days under room light or solar light, or by post exposure in the present invention, a dye in hologram is decomposed to lose absorption in the visible range, and colorless transparent volume hologram can be obtained.

The specific examples of the cyanine-based dye include anhydro-3,3'-dicarboxymethyl-9-ethyl-2,2'- thiacarbocyanine betaine, anhydro-3-carboxymethyl-3',9'-diethyl-2,2'-thiacarbocyanine betaine, 3,3',9-triethyl-2,2'-thiacarbocyanine-iodine salt, 3,9-diethyl-3'-carboxymethyl-2,2'-thiacarbocyanineiodine salt, 3,3',9-triethyl-2,2'-(4,5,4',5'-dibenzo)thiacarbocyanine iodine salt, 2-[3-(3-ethyl-2-benzothiazolidene)-1-propenyl]-6-[2-(3-ethyl-2-benzothiazolidene)ethylideneimino]-3-ethyl-1,3,5-thiadiazolim-iodine salt, 2-[[3-allyl-4-oxo-5-(3-n-propyl-5,6-dimethyl-2-benzothiazolidene)-ethylidene-2-thiazolinylidene ]methyl]3-ethyl-4,5-diphenylthiazoliniumiodine salt, 1,1',3,3,3',3'-hexamethyl-2,2'-indotricarbocyanine-iodine salt, 3,3'-diethyl-2,2'-thiatricarbocyanine-perchlorate, anhydro-l-ethyl-4-methoxy-3'-carboxymethyl-5'-chloro-2, 2'-q uinothiacyanine betaine, anhydro-5,5'-diphenyl-9-ethyl-3,3'-disulfopropyloxycarbocyanine hydroxide-triethylamine salt and the like, and these can be used by itself or in combination of two or more kinds.

As the active radical-generating compound which may be used in combination with a cyanine-based dye, diaryl iodonium salts, or 2,4,6-substituted-1,3,5-triazines are listed. When high photo-sensitivity is necessary, use of diaryl iodonium salts is particularly preferable. As the specific examples of the diaryl iodonium salts, chlorides, bromides, tetrafluoroborates, hexafluorophosphates, hexafluoroarsenates, hexafluoroantimonates, trifluoromethanesulfonates, 9,10-dimethoxyanthracene-2-sulfonates and the like of dipheriyl iodonium, 4,4'-dichlorodiphenyl iodonium, 4,4'-dimethoxydiphenyl iodonium, 4,4'-ditertiary-butyldiphenyl iodonium, 3,3'-dinitrodiphenyl iodonium and the like are listed. Specific examples of 2,4,6-substituted-1,3,5-triazines include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2,4-bis(trichloromethyl)-6-(p-methoxyphenylvinyl)-1,3,5-triazine, 2-(4'-methoxy-1'-naphthyl)-4,6-bis(trichloromethyl)-1,3,5-triazine and the like.

(Photo-Cationic Polymerization Initiator System)

The photo-cationic polymerization initiator system may advantageously be an initiator system which shows low sensitivity to the first exposure and which is sensitized by the post exposure irradiated with light of different wavelength from the wavelength of the first exposure to generate a Broensted acid or Lewis acid, and to cause polymerization of the cationic polymerizable compound, and that which does not cause polymerization of a cationic polymerizable compound during the first exposure is particularly preferable. As the photo-cationic polymerization initiator system, for example, diaryl iodonium salts, triaryl sulfonium salts, iron allene complexes and the like are listed. As the preferable diaryl iodonium salts, tetrafluoroborates, hexafluorophosphates, hexafluoroarsenates, hexafluoroantimonates and the like of iodonium shown for the above mentioned photo-radical polymerization initiator system are listed. As the preferable triarylsulfonium salts, triphenyl sulfonium, 4-tertiary-butyltriphenylsulfonium and the like are listed.

(Others)

If necessary, the photosensitive material may be used together with a binder resin, heat polymerization preventing agent, silane coupling agent, plasticizer, coloring agent and the like. The binder resin is used when the film forming property of a composition before hologram formation or evenness of film thickness is improved, or used for stable presence of interference fringe formed by polymerization by irradiation with light such as laser light and the like, until post exposure. The binder resin may advantageously be one showing excellent solubility with a cationic polymerizable compound and radical polymerizable compound, and for example, chlorinated polyethylene, polymethyl methacrylate, copolymer of methyl methacrylate and other alkyl ester (meth)acrylate, copolymer of vinyl chloride and acrylonitrile, polyvinyl acetate and the like are listed. The binder resin may have reactivity of a cationic polymerizable group and the like at its side chain or main chain.

(Photosensitive Material)

In the composition of a photosensitive material, the proportion of the cationic polymerizable compound is 2 wt % to 70 wt %, preferably 10 wt % to 50 wt %, the proportion of the radical polymerizable compound is 30 wt % to 90 wt %, preferably 40 wt % to 70 wt %, the proportion of the cationic polymerization initiator system is 0.3wt % to 8 wt %, preferably 1 wt % to 5 wt %, the proportion of the radical polymerization initiator is 0.3 wt % to 8 wt %, preferably 1 wt % to 5 wt %, based on the total weight of the composition. The above-mentioned photosensitive material can be prepared by mixing essential components and optional components as they are in cold and dark place using for example a high speed stirring machine, or it necessary, by compounding with for example a ketone-based solvent such as methyl ethyl ketone and the like, an ester-based solvent such as ethyl acetate and the like, an aromatic solvent such as toluene and the like, a cellosolve-based solvent such as methylcellosolve and the like, an alcohol-based solvent such as methanol and the like, an ether-based solvent such as tetrahydrofuran, dioxane and the like, or a halogen-based solvent such as dichloromethane, chloroform and the like.

A layer for forming volume hologram composed of such photosensitive materials can be formed by coating the photosensitive materials by the same coating method as for the photosensitive material (i) and drying the coated film. The coating amount is appropriately selected, and the film thickness after drying can be, for example, from 1 μm to 50 μm.

In the layer for forming volume hologram thus produced, interference fringe is recorded inside by polymerizing a radical polymerizable compound using, for example, laser light having a wavelength from 300 to 1200 nm. At this stage, diffracted light is obtained by the recorded interference fringe, and hologram is formed, however, for further polymerization of a cationic polymerizable compound remaining un-reacted, it is preferable to form hologram by whole surface irradiation with light having a wavelength of 200 nm to 700 nm at which a photo-cationic polymerization initiator system is sensitized, as post exposure. It is also possible to change diffraction efficiency, peak wavelength of diffracted light, half bandwidth and the like by treating a layer for forming volume hologram with heat or infrared ray before post exposure.

Here, the volume hologram layer of this embodiment preferably has a glass transition temperature of about 80° C. Therefore, for setting the breaking strain within the above mentioned range, it is necessary to previously determine the curing conditions of the selected hologram forming materials by previous experiments.

(3) Substrate

Next, the substrate used in this embodiment will be described. The substrate used in this embodiment is not particularly limited as long as the volume hologram layer can be formed on this, and for example, a polyethylene terephthalate (PET) film, polyvinyl chloride (PVC) film, polyvinylidene chloride film, polyethylene film, polypropylene film, polycarbonate film, cellophane film, acetate film, nylon film, polyvinyl alcohol film, polyamide film, polyamideimide film, ethylene-vinyl alcohol copolymer film, polymethyl methacrylate (PMMA) film, polyether sulfone film, polyether ether ketone (PEEK) film and the like can be used. The thickness of such a substrate is usually in a range of 5 μm to 200 μm, preferably in a range of 10 μm to 50 μm though it is appropriately selected depending on the application, kind and the like of a volume hologram transfer foil.

(4) Volume Hologram Transfer Foil

The volume hologram transfer foil of the present invention will be described. The constitution and the like of the volume hologram transfer foil of the present invention are not particularly limited as long as the it has the substrate, a volume hologram layer formed on the substrate, and the heat sensitive adhesive layer formed on the volume hologram layer, and as described above, it may also have a delaminating layer, primer layer, barrier layer and the like.

The delaminating layer is provided usually between the substrate and the volume hologram, and is a layer to give easy delamination of the substrate in transferring volume hologram to a transferred body by using a volume hologram transfer foil. As such a delaminating layer, there can be used for example acrylic and methacrylic resins such as polymethyl acrylate, polymethyl methacrylate, and polyvinyl chloride resin, cellulose resin, silicone resin, chlorinated rubber, casein, various surfactants, metal oxides and the like by itself or in a mixture of two or more kinds. Particularly, the delaminating layer of this embodiment is preferably formed by appropriately selecting materials so that the delaminating force between the substrate and volume hologram layer is 1 to 5 g/2.54 mm width (90° delamination). Such a delaminating layer can be formed on the surface of the substrate by making the resin and the like into ink and using a known method such as coating method and the like, and its thickness is preferably in a range of 0.1 µm to 2 µm in view of delaminating force, foil cutting and the like. This delaminating layer can also perform a function as a protective layer when a transferred body is distributed or used, since it is exposed to the outermost surface after transferred to a transferred body. In such a case, it is also called delaminating protective layer in some cases.

For enhancing adhesion between a volume hologram layer and heat sensitive adhesive layer, or for enhancing adhesion between a volume hologram layer and the delaminating layer, a primer layer may also be formed, if necessary. As such a primer layer, there can be used, for example, polyurethane, polyester, polyvinyl chloride-based resin, polyvinyl acetate-based resin, vinyl chloride-vinyl acetate copolymer, acrylic resin, polyvinyl alcohol-based resin, polyvinyl acetal resin, copolymer of ethylene with vinyl acetate or acrylic acid and the like, epoxy resin and the like. The primer layer used in this embodiment can be formed by dissolving or dispersing the resin appropriately in a solvent to give coating solution, and coating by a known coating method and drying this. The coating solution may also be formed by combining the resin with a monomer, oligomer, prepolymer and the like and a reaction initiator, curing agent, cross-linking agent and the like, or by combining a main agent with a curing agent and then coating, drying and, if necessary, reacting them by conducting aging treatment. The thickness of such a primer layer is from about 0.05 to 10 µm, preferably from about 0.1 to 5 µm.

Further, in this embodiment, a barrier layer may also be formed either between the delaminating layer and volume hologram layer, or between the volume hologram layer and heat sensitive adhesive layer, or in both positions. Depending on combination of photosensitive materials, delaminating layer and heat sensitive adhesive layer (heat sealing layer) used in this embodiment, migration of a component of lower molecular weight from a volume hologram layer to another layer occurs by time, and when, owing to this, the peak wavelength of the recorded hologram shifts to the blue side (shorted wavelength side) or this shifts to a delaminating layer and the like, its delaminating property may change in some cases. By providing such a barrier layer, these disturbance factors can be solved.

The material used in such a barrier layer is not particularly limited as long as it is a material manifesting its barrier property, and usually, its object can be attained by using a transparent organic resin material. It is preferable to use a non-solvent type 3 or more functional, preferably 6 or more functional ionizing radiation-curing epoxy denatured acrylate resin, urethane denatured acrylate resin, acryl denatured polyester resin and the like reacting to ionizing radiation such a ultraviolet ray, electron beam and the like, and particularly, urethane denatured acrylate resins are further preferable because of its high barrier property.

The ionizing radiation-curing resin having a molecular weight in a range of 500 to 2000 is preferable in view of its coating suitability, hardness of a barrier layer finally obtained, and the like. Since the coating of the barrier layer basically contains non solvent, it can be laminated on any of a volume hologram layer, delaminating layer and heat sensitive adhesive layer.

Further, the volume hologram transfer foil of this embodiment may have a reflective layer. The reflective layer is formed in between the heat sensitive adhesive layer and volume hologram layer, and when a film reflecting light, for example, a metal film and the like is used as the reflective layer, volume hologram of opaque type is obtained, and when a transparent substance showing a difference in refractive index from a hologram layer is used, volume hologram of transparent type is obtained, and both of them can be used in the present invention. Such a reflective layer can be formed by a known method such as sublimation, vacuum vapor deposition, sputtering, reactive sputtering, ion plating, electroplating and the like.

As the metal film for forming a hologram of opaque type, mentioned are films formed of, for example, a metal such as Cr, Ti, Fe, Co, Ni, Cu, Ag, Au, Ge, Al, Mg, Sb, Pb, Pd, Cd, Bi, Sn, Se, In, Ga, Rb and the like and oxide, nitride and the like thereof, by itself or in combination of two or more kinds of the metal films, Al, Cr, Ni, Ag, Au and the like are particularly preferable, and it is preferable that its film thickness is in a range of 1 to 10000 nm, preferably in a range of 20 to 200 nm.

On the other hand, as the film for forming a hologram of transparent type, films made of any material can be used as long as they are of light transparent type capable of manifesting a hologram effect. For example, there are listed transparent materials having different refractive index from that of the resin of a hologram forming layer (photosetting resin layer). In this case, the refractive index may be larger than or smaller than the refractive index of the resin of a hologram forming layer, and difference in refractive index is preferably 0.1 or more, more preferably 0.5 or more, and optimally 1.0 or more. Additionally, metal reflective films of 20 nm or less are listed besides the above, and as the transparent type reflective layer suitably used, titanium oxide ($TiO_2$), zinc sulfide (ZnS), Cu.Al complex metal oxide and the like are listed.

Here, the method of transferring the volume hologram transfer foil to a transferred body is as described above. The article as transferred body, is not particularly limited, and for example, it can be applied to plastic cards, portable telephones, premium tickets, daily necessities or, body of CD-ROM or wrapping or packages, and the like.

2. Second Embodiment

Next, the second embodiment of the volume hologram transfer foil of the present invention will be described. The second embodiment of the volume hologram transfer foil of the present invention comprises a substrate, a volume hologram layer formed on the substrate and a heat sensitive adhesive layer formed on the volume hologram layer, in which the heat sensitive adhesive layer contains a synthetic resin having heat sensitive adhesiveness and a fine particle having average particle size smaller than the film thickness of the heat sensitive adhesive layer.

As described above, the improvement of a transferring property of a volume hologram transfer foil to a transferred body has been desired. Then, the present inventors have further investigated the invention disclosed in JP-A No. 2000-272295 and resultantly found that by limiting fine particles (filler) added to a heat sensitive adhesive layer, a foil cutting property is improved, and a transferring property to a transferred body is improved, leading to completion of the invention. Furthermore, it is necessary to select fragile materials also for other members such as a heat sensitive adhesive layer, protective layer (also called OP layer) and the like in a volume hologram transfer foil. However, regarding a heat sensitive adhesive layer which should be made of a material showing the thermnoplasticity at low temperature, by addition of fine particles (filler), fragility can be improved and foil cutting in transferring can be helped to give excellent properties.

According to this embodiment, since fine particles having the above mentioned average particle size are contained, fragility can be imparted to the heat sensitive adhesive layer, and a volume hologram transfer foil having an excellent foil cutting property can be obtained while maintaining the brightness of a hologram image. Further, since the average particle size of the fine particles is within the above mentioned range, an excellent transferring property can be obtained without lowering the smoothness of the heat sensitive adhesive layer or the close adhesive force between the heat sensitive adhesive layer and a volume hologram layer and adhered body.

Components of the volume hologram layer of this embodiment will be illustrated below.

(1) Heat Sensitive Adhesive Layer

First, the heat sensitive adhesive layer used in the volume hologram transfer foil of this embodiment will be described. The heat sensitive adhesive layer used in this embodiment is a layer containing a synthetic resin having heat sensitive adhesiveness and a fine particle having average particle size smaller than the film thickness of the heat sensitive adhesive layer and adheres a volume hologram layer and a transferred body described later.

When the average particle size of the fine particles is larger than the film thickness of the heat sensitive adhesive layer, irregularity occurs on the surface of the heat sensitive adhesive layer and the smoothness of the heat sensitive adhesive layer deteriorates, consequently, there is a possibility that close adhesive force between a volume hologram layer and an adhered body lowers and an excellent transferring property cannot be obtained, therefore, in the present invention, the average particle size of the fine particles is smaller than the film thickness of the heat sensitive adhesive layer.

It is preferable that the average particle size of fine particles used in this embodiment is specifically from 0.05 µm to 10 µm, particularly from 0.01 µm to 6 µm. When the average particle size of the fine particles is lower than the above mentioned range, it becomes difficult to impart fragility to a heat sensitive adhesive layer, and when over the above mentioned range, dispersibility is poor, the smoothness of a heat sensitive adhesive layer deteriorates, and there is a possibility to exert an adverse influence on a hologram image. Here, the average particle size in this embodiment is a valued measured by the same method as in the above-mentioned first embodiment.

It is preferable that the content of such fine particles is 10 parts by weight to 500 parts by weight, particularly 20 parts by weight to 200 parts by weight based on 100 parts by weight of a synthetic resin constituting a heat sensitive adhesive layer. The reason for this is that when the content of the fine particles is smaller than the abovementioned range, a foil cutting property is poor, and when larger than the above mentioned range, dispersibility is poor, unevenness occurs in fragility, and the foil cutting property of a heat sensitive adhesive layer becomes instable. Further reason for this is that there is also a possibility of occurrence of decrease in adhesive force with an adhered body.

Here, regarding the synthetic resin and the fine particles in a heat sensitive adhesive layer used in this embodiment, the same materials as in the above-mentioned first embodiment can be used, therefore, detailed descriptions thereof are omitted.

As the fine particles used in this embodiment can be those not having a heat cross-linkable group and photo-crosslinkable group. The reason for this is as follows. The abovementioned fine particles are not cross-linked with the synthetic resin around them since they do not have the crosslinkable group. Therefore, by application of stress in transferring volume hologram, cracks easily occur between the fine particles and the synthetic resin, and it becomes possible to impart large fragility to a heat sensitive adhesive layer.

The thickness of such a heat sensitive adhesive layer is appropriately selected depending on the kind of a volume hologram transfer foil, the kind of a transferred body, and the like, and usually from about 1 µm to 11 µm, preferably from about 1 µm to 6 µm. The reason for this is that, with the thickness less than the above mentioned range, adhesion with a transferred body is not sufficient, and with the thickness over this above mentioned range, a foil cutting property is poor and heating temperature in transferring should be increased.

(2) Volume Hologram Layer

The volume hologram layer used in this embodiment will be illustrated below. The volume hologram layer used in this embodiment is not particularly limited as long as it is a layer on which a volume hologram image can be formed, and in this embodiment, the following photosensitive materials (i) and (ii) are suitably used particularly from the standpoint of production efficiency.

(i) Photosensitive material composed of binder resin, photopolymerizable compound, photo-polymerization initiator and sensitizing dye.

(ii) Photosensitive material composed of cationic polymerizable compound, radical polymerizable compound, photoradical polymerization initiator system which is sensitized by light of specific wavelength to cause polymerization of radical polymerizable compound, and photo-cationic polymerization initiator system which shows low sensitivity to light of specific wavelength and which is sensitized by light of other wavelength to cause polymerization of cationic polymerizable compound.

Here, regarding the photosensitive material used in this embodiment, the same materials as in the above-mentioned first embodiment are used, therefore, detailed descriptions thereof are omitted.

(3) Substrate

Next, the substrate used in this embodiment will be described. The substrate used in this embodiment is not particularly limited as long as the volume hologram layer can be formed on it, and the same materials as described in the above-mentioned first embodiment can be used, therefore, descriptions thereof are omitted here.

(4) Volume Hologram Transfer Foil

Next, the volume hologram transfer foil of the present invention will be described. The constitution and the like of the volume hologram transfer foil of the present invention are not particularly limited as long as it comprises the substrate, a volume hologram layer formed on the substrate and the heat sensitive adhesive layer formed on the volume hologram layer, and it may have a delaminating layer, primer layer, barrier layer, reflective layer and the like, as described above.

Here, regarding the breaking strain of the volume hologram layer at 25° C. and 120° C., in the volume hologram transfer foil of this embodiment, it is preferable that the breaking strain at 25° C. is in a range of 0.5% to 15%, particularly in a range of 1% to 10%, and the breaking strain at 120° C. is in a range of 0.5% to 30%, particularly in a range of 1% to 20%.

Furthermore, it is preferable that the breaking strain at 25° C. of the heat sensitive adhesive layer is in a range of 0.5% to 15%, particularly in a range of 1% to 10%. By setting the breaking strain of the volume hologram layer and heat sensitive adhesive layer respectively in the above mentioned ranges, the volume hologram transfer foil can have an excellent foil cutting property. When only either of the elongation of the volume hologram layer or the breaking strain of the heat sensitive adhesive layer is in the above mentioned range, the effect is insufficient. The above-mentioned breaking strain is a valued measured by the same method as in the above-mentioned first embodiment.

Here, the delaminating layer, primer layer, barrier layer, reflective layer and the like used in this embodiment are the same as in the above-mentioned first embodiment, therefore, descriptions thereof are omitted here.

3. Method for Manufacturing Volume Hologram Transfer Foil

Next, a method for manufacturing the volume hologram transfer foil will be described. In either embodiment of the volume hologram transfer foils, manufacturing is possible by the following method.

The preferable method for manufacturing a volume hologram transfer foil of the present invention is a method in which the first film having a volume hologram layer, the second film having a heat sensitive adhesive layer, and the third film having delaminating layer are prepared separately in independent processes, and they are laminated in the subsequent process in combination, depending on the application.

Specifically, first, the first film having a volume hologram layer, the second film having a heat sensitive adhesive layer, and the third film having delaminating layer are prepared separately in independent processes. Subsequently, a hologram image is formed on a volume hologram layer of the first film, then, the second film and if necessary the third film are laminated.

Here, the above mentioned substrate may be contained in the first film, or in the third film. Here, lamination of the first or third film can be conducted by a dry process, and there is no need to use a solvent, consequently, lamination can be conducted by a simple apparatus under mild condition, being advantageous for the process.

Further, the present invention also includes a method in which a film having a volume hologram layer, delaminating layer and a substrate and a film having a heat sensitive adhesive layer are prepared respectively by independent processes, a method in which a film having a volume hologram layer and a heat sensitive adhesive layer and a film having a delaminating layer and a substrate are prepared respectively by independent processes. Furthermore, the present invention also includes a method in which a volume hologram image is recorded on the volume hologram layer of the first film, then, the third film is laminated, a development treatment is conducted, and the second film is laminated on this.

Figure 5A:
FIG. 5 is a schematic sectional view showing another example of the volume hologram transfer foil of the present invention.
Figure 5B:
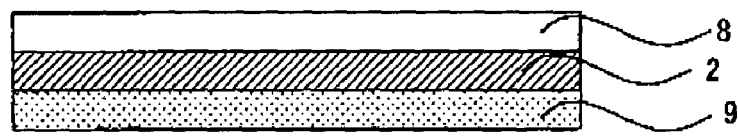
Figure 5C:
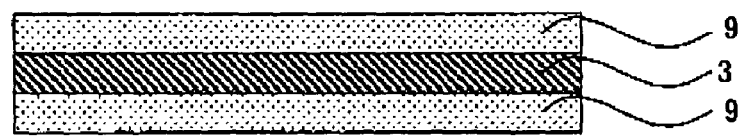

The sectional views of the first film, second film and third film used in manufacturing of a volume hologram transfer foil of the present invention are shown in FIGS. 5A, 5B and 5C. In FIGS. 5A, 5B and 5C, for easy understanding of the layer constitution, from the upper position, FIG. 5A shows a third film, FIG. 5B shows a first film and FIG. 5C shows a second film. When a substrate body or delaminating paper is present between films, they are delaminated, and the exposed layers are laminated. As the laminating method, it may be laminated, in general, by a simple dry process method in which layers are passed through between two rolls heated or not heated, or layers are sandwiched between plates heated or not heated and pressed.

The first film shown in FIG. 5B is produced by forming a volume hologram layer 2 on a substrate body 8 made of polyethylene terephthalate (abbreviated as PET), further laminating a delaminating layer PET as delaminating paper 9 (substrate body/volume hologram layer/delaminating paper). In this case, the cohesion force of the volume hologram layer is weak, therefore, a substrate body 8 may be used instead of the delaminating paper 9 to give a first film (substrate body/volume hologram layer/substrate body) In recording a volume hologram layer, as PET on the side irradiated with laser light, optical PET showing small drawing alignment and having small double refraction is optimal.

When the first film and the third film are not laminated, the substrate body may be the above mentioned substrate.

The second film shown in FIG. 5C is produced by forming a heat sensitive adhesive layer 3 on delaminative PET as delaminating paper 9, and forming delaminative PET as delaminating paper 9 on the heat sensitive adhesive layer 3 (delaminating paper/heat sensitive adhesive layer/delaminating paper). In this case, since the heat sensitive adhesive layer has no adhering property at normal temperature, either of the delaminating paper may not be present.

Further, the third film illustrated in FIG. 5A is that produced by forming a delaminating layer 5 on a substrate 1 made of PET and the like.

A volume hologram transfer foil can be formed by using the first to third films described above. First, a predetermined hologram image is recorded (exposed) on the volume hologram layer 2 of the first film illustrated in FIG. 5B, then, the substrate body 8 is delaminated and removed, and the delaminating layer 5 of the third film illustrated in FIG. 5A and the volume hologram layer 2 are laminated under heating (for example, 100° C. to 180° C.) so that they face to each other.

Next, this is introduced into a development treatment line, a predetermined heating treatment and UV treatment are performed, to fix the recorded image. Further, the delaminating paper 9 laminated on the volume hologram layer 2 is delaminated and removed to exposed the volume hologram layer 2, and the heat sensitive adhesive layer 3 exposed by delaminating the delaminating paper 9 of the second film shown in FIG. 5C and the volume hologram layer 2 are laminated under heating (for example, 100° C. to 180° C.) so that they face to each other, to give a layer constitution of substrate/delaminating layer/volume hologram layer/heat sensitive adhesive layer/delaminating paper. By delaminating the delaminating paper from such a structure, a transfer foil comprising substrate/delaminating layer/volume hologram layer/heat sealing layer can be obtained. Depending on application, a layer constitution of substrate/volume hologram layer/heat sensitive adhesive layer/delaminating paper may also be provided without using the third film.

Here, the delaminating paper has delaminating property at one surface of a substrate film, referred to as so-called "sepa" paper (also called separating paper, delaminating paper) by those skilled in the art, such as high quality paper, coat paper, impregnated paper, plastic film and the like. As the substrate film of the delaminating paper used in the present invention, polyethylene terephthalate is suitable from the standpoint of surface smoothness, heat resistance and the like, and this is also called a surface delaminating treated type PET film. The thickness of the plastic film is not particularly limited and usually from about 6 μm to 250 μm, suitably from 12 μm to 100 μm. The reason for this is that when less than this range; mechanical strength lacks so that cutting and wrinkle are generated, due to small thickness, and over this range, strength is excess and cost is high.

The releasing layer used in such delaminating paper is not particularly limited as long as it is made of a material showing delaminating property, and for example, silicone resins, organic resin denatured silicone resins, fluorine resins, aminoalkyd resins, polyester resins and the like are listed. As these resins, any of emulsion type, solvent type and non-solvent type can be used.

The thickness of such a releasing layer is not particularly limited and usually can be from about 0.01 μm to 3 μm, preferably from about 0.05 μm to 1 μm. The reason for this is that when this thickness is less than 0.01 μm, coating of a substrate film is not sufficient and poor delamination generates, on the other hand, when the thickness is larger than 3 μm, the absolute amount of unreacted materials and silicone of lower molecular weight increases, causing migration of silicone of lower molecular weight and blocking. It is preferable that the delaminating force of there leasing layer is from about 1 to 2000 mN/cm, further from 100 to 1000 mN/cm to an adhesive tape. When the delaminating force of the releasing layer is less than 1 mM/cm, delaminating force from an adhesive sheet and non-adhesive agent is weak, and delamination and partial lifting occur. When over 2000 mN/cm, the delaminating force of a releasing layer is strong, making it difficult to delaminate. Preferable are curing type silicone resins for delaminating paper of adding type and/or polycondensation type mainly composed of polydimethylsiloxane from the standpoint of stable delaminating property and processability.

For obtaining such a releasing layer, coating solution prepared by dispersing and/or dissolving releasing layer components is coated on one surface of the substrate film, and dried with heating and/or cured. As the method of coating the coating solution, any known coating method can be used, and for example, roll coat, reverse roll coat, gravure coat, gravure reverse coat, comma coat, bar coat, wire bar coat, rod coat, kiss coat, knife coat, die coat, flow coat, dip coat, spray coat and the like are listed. The releasing layer may be formed on at least one surface or on some parts of the both surfaces of a substrate film, as needed.

4. Others

Here, the present invention also includes a method of controlling interlayer adhesion force of each films of the first or the third films. Namely, it is preferable that, in the layer structure of a transfer foil, the relative correlation of interlayer adhesion force A between the delaminating layer and substrate, interlayer adhesion force B between the delaminating layer and volume hologram layer and interlayer adhesion force C between the volume hologram layer and heat sensitive adhesive layer and the value of this B satisfy the following correlation.

Interlayer adhesion force; C≧B>A

B value; 600 gf/2.54 mm width

In a preferable embodiment of the present invention, it is particularly preferable that the delaminating layer comprises an acrylic resin having a molecular weight of about 20000 to 100000 by itself, or such an acrylic resin and a vinyl chloride-vinyl acetate copolymer resin having a molecular weight of 8000 to 20000, further containing 1 to 5 wt % of a polyester resin having a molecular weight of 1000 to 5000 as an additive.

The second film can have a constitution comprising delaminating paper, adhesive layer and delaminating paper in which both surfaces are composed of a delaminating layer. As described above, in delaminating one delaminating paper from the second film, if delaminating forces of delaminating paper on both sides are the same, delamination of only one of the delaminating paper cannot be done smoothly. Therefore, a difference in delaminating force between delaminating paper on both sides is provided. For providing a difference in delaminating force, a releasing layer coated on a substrate film of delaminating paper may be changed. Delaminating paper of grades called, by those skilled in the art, strong delaminating type, intermediate delaminating type, weak delaminating type, re-delaminating type and the like are commercially available and may appropriately be selected among them.

The present invention is not limited to the above-mentioned embodiment. The above-mentioned embodiment is only an example, and any embodiments having substantially the same constitution and performing the same action and effect as the technological idea described in claims of the present invention are included in the technological range of the present invention.

EXAMPLES

The following examples and comparative examples will illustrate the present invention specifically.

Example 1

[Preparation of Materials]

A first film having a hologram forming layer (PET film/volume type hologram forming material/surface delaminating treated PET film), a third film having a delaminating layer (delaminating layer/PET film) and a second film having a heat sensitive adhesive layer to which fine particles had been added (heat sensitive adhesive layer/surface delaminating PET film) were separately prepared in respective independent processes.

The first film was produced by coating the following photosensitive material composition on a PET film (Lumirror T60 (50 μm); manufactured by Toray Industries, Inc.) so that the dry thickness was 10 μm, and laminating a surface delaminating treated PET film (manufactured by TOHCELLO. CO, SP-PET (38 μm)).

| Photosensitive material composition | |
| --- | --- |
| Polymethyl methacrylate-based resin (molecular weight 200000) | 500 parts by weight |
| 3,9-diethyl-3'-carboxylmethyl-2,2'-thiacarboxyanine iodine salt | 5 parts by weight |
| Diphenyl iodonium hexafluoro antimonate | 60 parts by weight |
| 2,2'-bis[4-(acryloxydiethoxy)phenyl]propane | 800 parts by weight |
| Pentaerythritol polyglycidyl ether | 800 parts by weight |

The third film was produced by coating the following delaminating layer composition on a PET film (Lumilar T60 (50 μm); manufactured by Toray Industries, Inc.) so that the dry thickness was 2 μm.

| Delaminating layer composition | |
| --- | --- |
| Polymethyl methacrylate resin (Mw = 35000) | 97 parts by weight |
| Polyethylene wax (Mw = 10000) | 3 parts by weight |
| Polyester (Mw = 1500) | 0.3 parts by weight |
| Methyl ethyl ketone | 200 parts by weight |
| Toluene | 200 parts by weight |

The second film was produced by coating the following heat sensitive adhesive layer composition on a surface delaminating treated type PET film (SP-PET (50 μm); manufactured by TOHCELLO. CO) so that the thickness after drying was 3 μm.

| Heat sensitive adhesive layer composition | |
| --- | --- |
| Heat sensitive adhesive (A-928; manufactured by Dainippon Ink and Chemicals, Incorporated) | 100 parts by weight |
| Silica fine particle (average particle size: 50 nm) | 20 parts by weight |
| Toluene | 600 parts by weight |
| Methyl ethyl ketone | 100 parts by weight |

[Lamination of Hologram Recording Delaminating Surface Protective Layer]

First, a surface delaminating treated PET film was delaminated from one surface of the first film on which Lippman hologram had been recorded by using laser ray having a wavelength of 514 nm and heated at 100° C. for 10 minutes, and on the delaminated surface, the surface of the surface protective layer of the third film was laminated at 80° C. By this, a laminating body composed of PET film/delaminating layer/volume hologram layer/PET film was obtained.

[Lamination of Heat Sensitive Adhesive Layer]

Next, the hologram layer was subjected to a fixing treatment by irradiation at 2500 mJ/cm² by using a high pressure mercury lamp, then, a PET film which contacts to the volume hologram was delaminated, and on the delaminated surface, the surface of the heat sensitive adhesive of the second film was laminated at 130°. By this, a laminating body of a volume hologram transfer foil of the present invention was obtained composed of PET film/delaminating surface protective layer/ volume hologram layer/heat sensitive adhesive containing fine particle/surface delaminating treated PET film.

The hologram layer in Example 1 had a breaking strain of 6% at 25° C. and 13% at 120° C. The adhesive of the heat sensitive adhesive layer had a breaking strain of 6.4% at 25° C. Regarding a transferring property, a foil cutting property was excellent. A transfer foil showing a bright hologram image and providing very easy observation was obtained.

Comparative Example 1

[Preparation of Materials]

For films other than the second film (heat sensitive adhesive layer), the same materials as used in Example 1 are used.

The second film was produced by coating the following heat sensitive adhesive layer composition on a surface delaminating treated PET film (SP-PET (50 μm); manufactured by TOHCELLO. CO) so that the dry thickness was 3 μm.

| Heat sensitive adhesive layer composition | |
| --- | --- |
| Heat sensitive adhesive (A-928; manufactured by Dainippon Ink and Chemicals, Incorporated) | 100 parts by weight |
| Toluene | 600 parts by weight |

[Production of Hologram Transfer Foil]

A volume hologram transfer foil composed of PET film/ delaminating surface protective layer/ volume hologram/ heat sensitive adhesive not containing fine particle/surface delaminating treated PET film was obtained. In the volume hologram transfer foil in Comparative Example 1, the adhesive of the heat sensitive adhesive layer had a breaking strain at 25° C. of 20% or more. Regarding a transferring property, a foil cutting property was poor, burr was generated, and excellent transfer to a transferred body was impossible because of elongation of the heat sensitive adhesive.

Example 2

A volume hologram transfer foil was obtained in the same manner as in Example 1 except that Luminova G-300 F having an average particle size of 10 μm (manufactured by NEMOTO & CO., LTD., trade name of fluorescent pigment) was used as a fluorescent fine particle instead of the silica fine particle, and the thickness of the heat sensitive adhesive layer was 11 μm. In the volume hologram transfer foil, the adhesive of the heat sensitive adhesive layer had a breaking strain at 25° C. of 13.5%. Regarding a transferring property, a foil cutting property was excellent. A transfer foil showing a bright hologram image and providing very easy observation was obtained.

Example 3

A volume hologram transfer foil was obtained in the same manner as in Example 1 except that 20 parts by weight of an acrylic fine particle (manufactured by Sekisui Plastics Co., Ltd., TECHPOLYMER MB-5: average particle size 5 μm) was used instead of 20 parts by weight of the silica fine particle and the thickness of the heat sensitive adhesive layer was 6 μm. In the volume hologram transfer foil, the adhesive of the heat sensitive adhesive layer had a breaking strain at 25° C. of 5.3%. Regarding a transferring property, a foil cutting property was excellent. A transfer foil showing a bright hologram image and providing very easy observation was obtained.

Example 4

A volume hologram transfer foil was obtained in the same manner as in Example 1 except that 20 parts by weight of an acrylic fine particle (manufactured by Soken Chemical & Engineering Co., Ltd., CHEMISNOW MP-1000: average particle size 400 nm) was used instead of 20 parts by weight of the silica fine particle. In the volume hologram transfer foil, the adhesive of the heat sensitive adhesive layer had a breaking strain at 25° C. of 7.5%. Regarding a transferring property, a foil cutting property was excellent. A transfer foil showing a bright hologram image and providing very easy observation was obtained.

Example 5

A volume hologram transfer foil was obtained in the same manner as in Example 1 except that 20 parts by weight of an acrylic fine particle (manufactured by Soken Chemical & Engineering Co., Ltd., CHEMISNOW MR-2G: average particle size 1 μm) was used instead of 20 parts by weight of the silica fine particle. In the volume hologram transfer foil, the adhesive of the heat sensitive adhesive layer had a breaking strain at 25° C. of 4.5%. Regarding a transferring property, a foil cutting property was excellent. A transfer foil showing a bright hologram image and providing very easy observation was obtained.

Example 6

A volume hologram transfer foil was obtained in the same manner as in Example 1 except that 20parts by weight of an acrylic fine particle (manufactured by Soken Chemical & Engineering Co., Ltd., CHEMISNOW MS-300X; average particle size 100 nm) was used instead of 20 parts by weight of the silica fine particle. In the volume hologram transfer foil, the adhesive of the heat sensitive adhesive layer had a breaking strain at 25° C. of 9.8%. Regarding a transferring property, a foil cutting property was excellent. A transfer foil showing a bright hologram image and providing very easy observation was obtained.

Example 7

A volume hologram transfer foil was obtained in the same manner as in Example 1 except that 20 parts by weight of an acrylic fine particle (manufactured by Soken Chemical & Engineering Co., Ltd., CHEMISNOW MP-1000: average particle size 400 nm) was used instead of 20 parts by weight of the silica fine particle and the thickness of the heat sensitive adhesive layer was changed from 3 μm to 1 μm. In the volume hologram transfer foil, the adhesive of the heat sensitive adhesive layer had a breaking strain at 25° C. of 7.5%. Regarding a transferring property, a foil cutting property was excellent. A transfer foil showing a bright hologram image and providing very easy observation was obtained.

Example 8

A volume hologram transfer foil was obtained in the same manner as in Example 1 except that 200 parts by weight of the silica fine particles were used. In the volume hologram transfer foil, the adhesive of the heat sensitive adhesive layer had a breaking strain at 25° C. of 3.2%. Regarding a transferring property, a foil cutting property was excellent. A transfer foil showing a bright hologram image and providing very easy observation was obtained.

Comparative Example 2

A volume hologram transfer foil was obtained in the same manner as in Example 1 except that the photosensitive material composition for recording volume hologram described in Example 1 was changed as described below.

| Photosensitive material composition | |
|---|---|
| polyvinyl acetate resin (molecular weight: 100000) | 500 parts by weight |
| 2-phenoxyethyl acrylate | 600 parts by weight |
| 2-ethoxyethyl acrylate | 600 parts by weight |
| Hexaallylbiimidazole | 50 parts by weight |
| 2,5-bis[4-(diethylamino)phenyl]methylene-cyclopentanone | 5 parts by weight |

The breaking strain of the hologram layer was 30% at 25° C., and at 120° C., the hologram layer was elongated ultimately directly after setting on a measuring apparatus, and measurement was impossible. Regarding a transferring property, a foil cutting property was poor, burr was generated, and excellent transfer to a transferred body was impossible because of elongation of the hologram layer.

Comparative Example 3

A volume hologram transfer foil was obtained in the same manner as in Example 1 except that 20 parts by weight of an acrylic fine particle (manufactured by Soken Chemical & Engineering Co., Ltd., CHEMISNOW MR-20G: average particle size 20 μm) was used instead of 20 parts by weight of the silica fine particle and the thickness of the heat sensitive adhesive layer was changed from 3 μm to 11 μm. In the volume hologram transfer foil, the adhesive of the heat sensitive adhesive layer had a breaking strain at 25° C. of 3.8%. Since the average particle size of the fine particles was larger than the thickness of the heat sensitive adhesive layer, irregularity on the surface of the heat sensitive adhesive layer was large because of an influence by the fine particles, close adherence with the hologram layer was poor, and excellent transfer to a transferred body was impossible.

Comparative Example 4

A volume hologram transfer foil was obtained in the same manner as in Example 1 except that the thickness of the heat sensitive adhesive layer was changed from 3 μm to 15 μm. In this case, since the thickness of the heat sensitive adhesive layer was too large, excellent transfer to a transferred body was impossible.

What is claimed is:

1. A volume hologram transfer foil comprising a substrate, a volume hologram layer formed on the substrate and a heat sensitive adhesive layer formed on the volume hologram layer,
    wherein the volume hologram layer has a breaking strain at 25° in range of 0.5% to 15%, breaking strain at 120° C. in a range of 0.5% to 30%,
    the heat sensitive adhesive layer has a breaking strain at 25° C. in range of 0.5% to 15%, and a difference in the breaking strain 25° C. between the volume hologram layer and the heat sensitive adhesive layer is 7.5% or less.

2. The volume hologram transfer foil according to claim 1, wherein the heat sensitive adhesive layer contains a fine particle.

3. The volume hologram transfer foil according to claim 2, wherein the fine particle is an organic fine particle having thermoplasticity and having a glass transition temperature of 120° or higher.

4. The volume hologram transfer foil according to claim 2, wherein the fine particle is resin bead pigment.

5. The volume hologram transfer foil according to claim 2, wherein the fine particle is a fluorescent fine particle.

6. The volume hologram transfer foil according to claim 1, wherein a delaminating layer is provided in between the substrate and the volume hologram layer, is provided in between the substrate and the volume hologram layer.

* * * * *